(12) United States Patent
Qiao et al.

(10) Patent No.: US 11,768,912 B2
(45) Date of Patent: Sep. 26, 2023

(54) PERFORMING MULTIVARIATE TIME SERIES PREDICTION WITH THREE-DIMENSIONAL TRANSFORMATIONS

(71) Applicant: International Business Machines Corporation, Armonk, NY (US)

(72) Inventors: Mu Qiao, Belmont, CA (US); Yuya Jeremy Ong, Tenafly, NJ (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 16/510,712

(22) Filed: Jul. 12, 2019

(65) Prior Publication Data

US 2021/0012191 A1   Jan. 14, 2021

(51) Int. Cl.
| | | |
|---|---|---|
| G06F 17/18 | (2006.01) | |
| G06N 3/08 | (2023.01) | |
| G06F 17/15 | (2006.01) | |
| G06N 20/10 | (2019.01) | |
| G06F 18/213 | (2023.01) | |

(52) U.S. Cl.
CPC .............. *G06F 17/18* (2013.01); *G06F 17/15* (2013.01); *G06F 18/213* (2023.01); *G06N 3/08* (2013.01); *G06N 20/10* (2019.01)

(58) Field of Classification Search
CPC .......... G06N 3/08; G06N 20/10; G06F 17/15; G06K 9/6232
USPC ......................................................... 706/25
See application file for complete search history.

(56) References Cited

U.S. PATENT DOCUMENTS

| | | | | |
|---|---|---|---|---|
| 6,038,338 | A * | 3/2000 | Nguyen | G06F 18/2137 |
| | | | | 382/158 |
| 7,707,091 | B1 | 4/2010 | Kauffman et al. | |
| 7,716,011 | B2 * | 5/2010 | Thibaux | H04L 63/1425 |
| | | | | 702/179 |
| 9,165,243 | B2 * | 10/2015 | Yu | G06N 3/04 |
| 9,373,059 | B1 * | 6/2016 | Heifets | G06T 1/60 |
| 10,002,322 | B1 * | 6/2018 | Ravindran | G06Q 30/02 |
| 10,037,305 | B2 * | 7/2018 | Leonard | G06F 16/34 |
| 10,685,283 | B2 * | 6/2020 | Li | G06F 16/285 |
| 11,157,782 | B2 * | 10/2021 | Bathen | G06N 3/044 |
| 11,200,511 | B1 * | 12/2021 | London | G06N 7/01 |
| 2005/0283337 | A1 * | 12/2005 | Sayal | G06Q 10/00 |
| | | | | 702/179 |

(Continued)

OTHER PUBLICATIONS

Choy et al. (4D Spatio-Temporal ConvNets: Minkowski Convolutional Neural Networks, arXiv, 2019, pp. 1-21). (Year: 2019).*

(Continued)

*Primary Examiner* — Iftekhar A Khan
(74) *Attorney, Agent, or Firm* — Zilka-Kotab, P.C.

(57) ABSTRACT

A computer-implemented method according to one embodiment includes receiving historical two-dimensional (2D) multivariate time series data; transforming the historical 2D multivariate time series data into a three-dimensional (3D) temporal tensor; training one or more deep volumetric 3D convolutional neural networks (CNNs), utilizing the 3D temporal tensor; and predicting future values for additional multivariate time series data, utilizing the one or more trained deep volumetric 3D CNNs.

19 Claims, 5 Drawing Sheets

(56) References Cited

U.S. PATENT DOCUMENTS

| | | | |
|---|---|---|---|
| 2013/0110753 A1* | 5/2013 | Hao | G06F 18/00 706/46 |
| 2013/0212052 A1* | 8/2013 | Yu | G06N 3/04 706/27 |
| 2014/0279779 A1* | 9/2014 | Zou | G06N 3/049 706/25 |
| 2015/0296214 A1* | 10/2015 | Mahfoodh | H04N 19/46 382/233 |
| 2016/0379109 A1* | 12/2016 | Chung | G06N 3/063 706/26 |
| 2017/0249534 A1* | 8/2017 | Townsend | G06V 10/82 |
| 2017/0364803 A1* | 12/2017 | Calmon | G06N 3/045 |
| 2017/0372224 A1* | 12/2017 | Reimann | G06N 3/08 |
| 2018/0240024 A1* | 8/2018 | Huang | G06F 16/2433 |
| 2018/0260704 A1* | 9/2018 | Sun | G06N 3/08 |
| 2019/0026639 A1* | 1/2019 | Vasudevan | G06N 5/046 |
| 2019/0354870 A1* | 11/2019 | Odena | G06N 3/084 |
| 2019/0391574 A1* | 12/2019 | Cheng | G06N 3/044 |
| 2021/0012191 A1* | 1/2021 | Qiao | G06F 17/15 |
| 2021/0350225 A1* | 11/2021 | Dang | G06N 3/088 |

OTHER PUBLICATIONS

Shomron et al. (Spatial Correlation and Value Prediction in Convolutional Neural Networks, arXiv, 2019, pp. 1-4). (Year: 2019).*

Yamashita et al. (Convolutional neural networks: an overview and application in radiology, 2018, Springer, pp. 611-629) (Year: 2018).*

Yang et al. (Multivariate Time Series Data Transformation for Convolutional Neural Network, 2019, IEEE, pp. 188-192) (Year: 2019).*

Vu et al. (3D convolutional neural network for feature extraction and classification of fMRI vols. 2018, IEEE, pp. 1-4) (Year: 2018).*

Lu et al. (A 3D Convolutional Neural Network for Volumetric Image Semantic Segmentation, 2019, Procedia Manufacturing 39 (2019) 422-428) (Year: 2019).*

Liu et al. (Time Series Classification With Multivariate Convolutional Neural Network, 2019, IEEE, pp. 4788-4797) (Year: 2019).*

Jiang et al., "Time Series Prediction for Evolutions of Complex Systems: A Deep Learning Approach," IEEE, International Conference on Control and Robotics Engineering (ICCRE), 2016, 6 pages.

He et al., "Deep Residual Learning for Image Recognition," arXiv, Dec. 10, 2015, pp. 1-12, including supplemental information, retrieved from https://arxiv.org/pdf/1512.03385.pdf.

Perera, A., "What is Padding in Convolutional Neural Network's(CNN's) padding," Medium, Sep. 1, 2018, 3 pages, retrieved from https://medium.com/@ayeshmanthaperera/what-is-padding-in-cnns-71b21fb0dd7.

Yu et al., "Multi-Scale Context Aggregation by Dilated Convolutions," arXiv, published as a conference paper at ICLR 2016, Apr. 30, 2016, pp. 1-13, retrieved from https://arxiv.org/pdf/1511.07122.pdf.

* cited by examiner

PERFORMING MULTIVARIATE TIME SERIES PREDICTION WITH THREE-DIMENSIONAL TRANSFORMATIONS

BACKGROUND

The present invention relates to time data analysis, and more specifically, this invention relates to performing time series prediction using transformed data.

Multivariate time series forecasting involves predicting future values of a period of multiple variables based on their historical values. This allows for the discovery of new trends, the detection of anomalies, and the improved prediction of future signals to be used across different domains. However, current methods for performing such forecasting are based on statistical assumptions such as the data being stationary (i.e. having a consistent mean and variance). As a result of these assumptions, additional manual preprocessing and feature engineering is necessary to perform forecasting, which may not adequately capture some of the non-linearities of the data. Also, many current forecasting methods require large amounts of computational resources. This becomes a challenge when provided input data has very large feature and temporal dimensions.

SUMMARY

A computer-implemented method according to one embodiment includes receiving historical two-dimensional (2D) multivariate time series data; transforming the historical 2D multivariate time series data into a three-dimensional (3D) temporal tensor; training one or more deep volumetric 3D convolutional neural networks (CNNs), utilizing the 3D temporal tensor; and predicting future values for additional multivariate time series data, utilizing the one or more trained deep volumetric 3D CNNs.

According to another embodiment, a computer program product for performing multivariate time series prediction with three-dimensional transformations includes a computer readable storage medium having program instructions embodied therewith, where the program instructions are executable by a processor to cause the processor to receive, utilizing the processor, historical two-dimensional (2D) multivariate time series data; transform, utilizing the processor, the historical 2D multivariate time series data into a three-dimensional (3D) temporal tensor; train, utilizing the processor, one or more deep volumetric 3D convolutional neural networks (CNNs), utilizing the 3D temporal tensor; and predict future values for additional multivariate time series data, utilizing the processor and the one or more trained deep volumetric 3D CNNs.

According to another embodiment, a system includes a processor; and logic integrated with the processor, executable by the processor, or integrated with and executable by the processor, where the logic is configured to receive historical two-dimensional (2D) multivariate time series data; transform the historical 2D multivariate time series data into a three-dimensional (3D) temporal tensor; train one or more deep volumetric 3D convolutional neural networks (CNNs), utilizing the 3D temporal tensor; and predict future values for additional multivariate time series data, utilizing the one or more trained deep volumetric 3D CNNs.

Other aspects and embodiments of the present invention will become apparent from the following detailed description, which, when taken in conjunction with the drawings, illustrate by way of example the principles of the invention.

DETAILED DESCRIPTION

Figure 1:
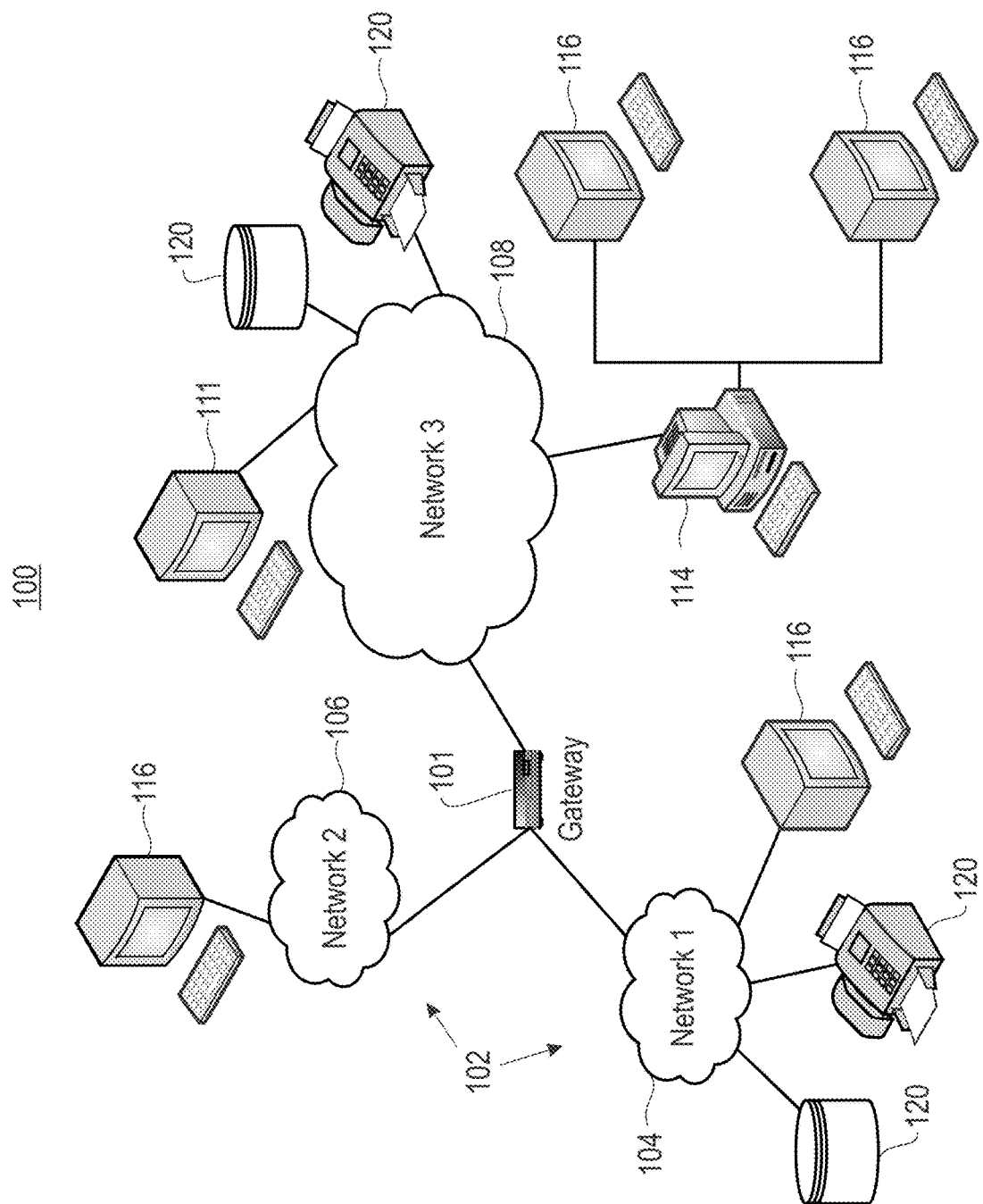
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing multivariate time series prediction with three-dimensional transformations.

In one general embodiment, a computer-implemented method includes receiving historical two-dimensional (2D) multivariate time series data; transforming the historical 2D multivariate time series data into a three-dimensional (3D) temporal tensor; training one or more deep volumetric 3D convolutional neural networks (CNNs), utilizing the 3D temporal tensor; and predicting future values for additional multivariate time series data, utilizing the one or more trained deep volumetric 3D CNNs.

In another general embodiment, a computer program product for performing multivariate time series prediction with three-dimensional transformations includes a computer readable storage medium having program instructions embodied therewith, where the program instructions are executable by a processor to cause the processor to receive, utilizing the processor, historical two-dimensional (2D) multivariate time series data; transform, utilizing the processor, the historical 2D multivariate time series data into a three-dimensional (3D) temporal tensor; train, utilizing the processor, one or more deep volumetric 3D convolutional neural networks (CNNs), utilizing the 3D temporal tensor; and predict future values for additional multivariate time series data, utilizing the processor and the one or more trained deep volumetric 3D CNNs.

In another general embodiment, a system includes a processor; and logic integrated with the processor, executable by the processor, or integrated with and executable by the processor, where the logic is configured to receive historical two-dimensional (2D) multivariate time series data; transform the historical 2D multivariate time series data into a three-dimensional (3D) temporal tensor; train one or more deep volumetric 3D convolutional neural networks (CNNs), utilizing the 3D temporal tensor; and predict future values for additional multivariate time series data, utilizing the one or more trained deep volumetric 3D CNNs.

FIG. illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
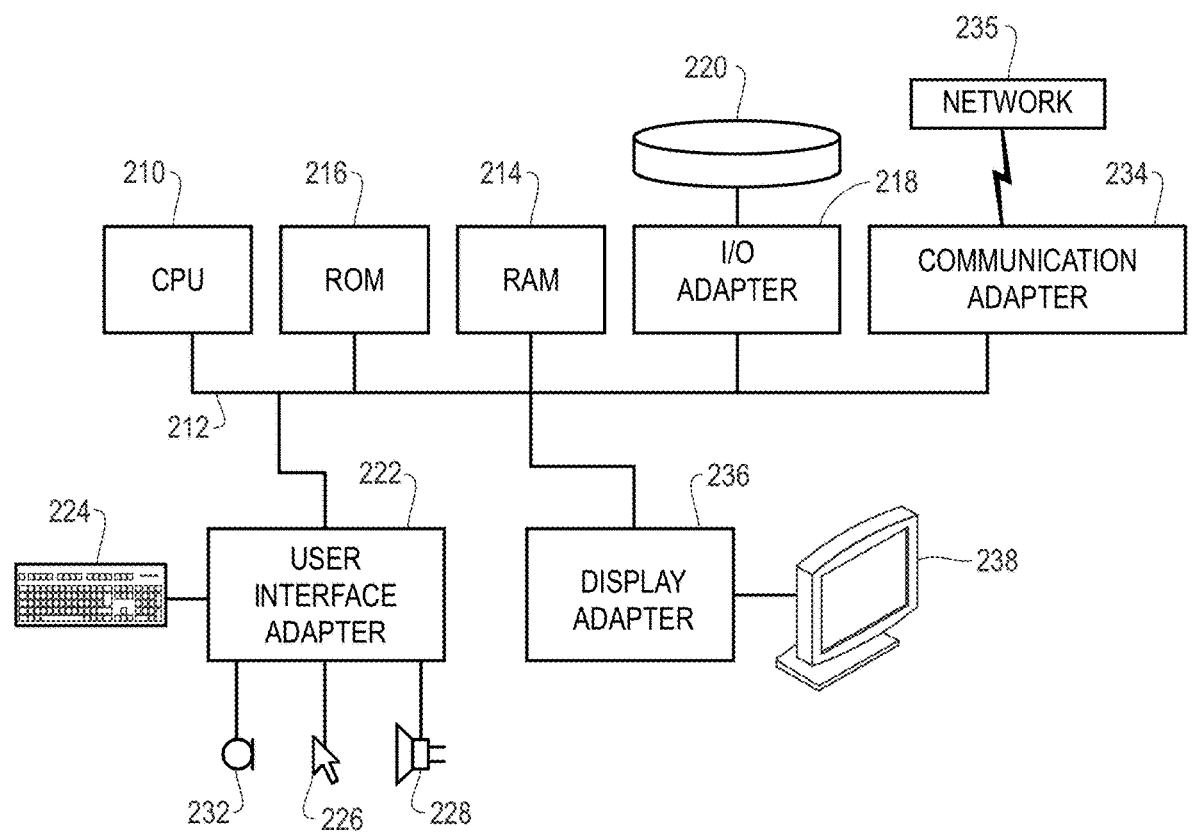
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. This figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network), and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
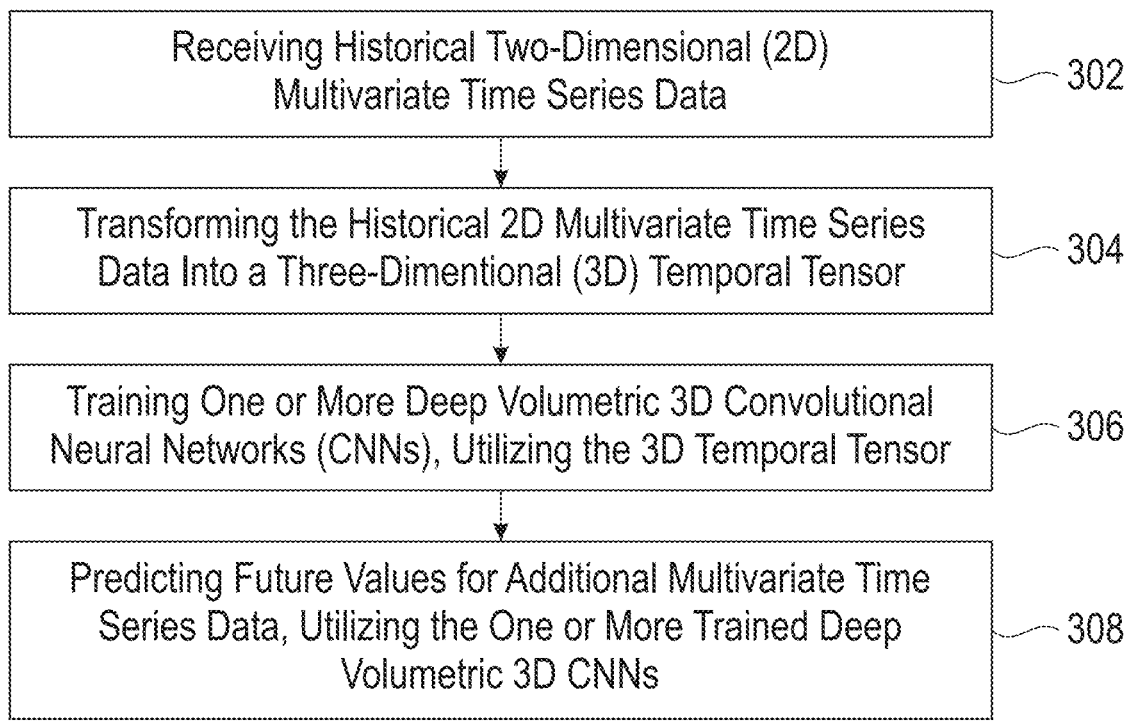
FIG. 3 illustrates a method for performing multivariate time series prediction with three-dimensional transformations, in accordance with one embodiment of the present invention.

Now referring to FIG. 3, a flowchart of a method 300 is shown according to one embodiment. The method 300 may be performed in accordance with the present invention in any of the environments depicted in FIGS. 1, 2, 4, and 5, among others, in various embodiments. Of course, greater or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where historical two-dimensional (2D) multivariate time series data is received. In one embodiment, the historical 2D multivariate time series data include 2D multivariate time series data that has been recorded prior to a current time and date. In another embodiment, time series data may include data values recorded at each of a plurality of different time intervals.

Additionally, in one embodiment, multivariate time series data may include a plurality of different data values for a plurality of different features recorded at each of a plurality of predetermined time intervals occurring over a predetermined period of time. For example, the multivariate time series data may be obtained at each time interval from one or more sensors (e.g., as part of an internet of things (IoT) environment, etc.). In another example, the data variables may include one or more of temperature values, humidity values, power usage values, water usage values, etc.

Further, in one embodiment, the 2D multivariate time series data may include time series data with two dimensions. For example, a first dimension of the 2D multivariate time series data may include a time dimension (e.g., a value for an historical time at which the second dimension was recorded, etc.). In another example, a second dimension of the 2D multivariate time series data may include a feature dimension (e.g., a value for a plurality of features at an associated predetermined historical time).

Further still, method 300 may proceed with operation 304, where the historical 2D multivariate time series data is transformed into a three-dimensional (3D) temporal tensor. In one embodiment, the transforming may include dividing the historical 2D multivariate time series data into a plurality of 2D temporal slices. For example, the historical 2D multivariate time series data may be recorded over a predetermined time period.

Also, in one embodiment, the predetermined time period may be divided into a plurality of time-based portions. The multivariate time series data may then be divided into a plurality of slices, based on the plurality of time-based portions. For example, historical 2D multivariate time series data recorded for a time period of one minute may be divided into six ten-second slices. The first temporal slice may include all time series data for the first ten second portion/slice. The second temporal slice may include all time series data for the second ten second portion/slice, etc.

In addition, in one embodiment, the transforming may include stacking the plurality of temporal slices to create the 3D temporal tensor. For example, the tensor may include a three-dimensional geometric object representative of the stacked 2D slices. In another embodiment, the historical 2D multivariate time series data may be viewed as a video (e.g., a sequence of frames presented over time). For example, each frame may constitute a single time-based portion. In another example, these frames may be separated and stacked to create the 3D temporal tensor.

Furthermore, in one embodiment, the 3D temporal tensor may include a tensor with three dimensions. For example, the temporal tensor may include a time-based geometric object represented by an array of components that are functions of the coordinates of a space. In another example, a first dimension may include a time dimension, a second dimension may include a feature dimension, and a third dimension may include a depth dimension (e.g., a value representing a depth of the temporal slice within the tensor, etc.).

Further still, method 300 may proceed with operation 306, where one or more deep volumetric 3D convolutional neural networks (CNNs) are trained, utilizing the 3D temporal tensor. In one embodiment, the deep volumetric 3D CNNs may each include a residual network-based module used for extraction of non-linear feature-temporal and auto-correlational features.

Also, in one embodiment, the deep volumetric 3D CNNs may discover local dependency and auto-correlational patterns among the values of the dimensions of the 3D tensor.

During training, volumetric convolutions of the one or more deep volumetric 3D CNNs may learn a three-dimensional kernel (e.g., instead of a separate feature-wise kernel). This may result in joint learning of feature-dependent and temporal correlations from the 3D temporal tensor data.

Additionally, method 300 may proceed with operation 308, where future values for additional multivariate time series data are predicted, utilizing the one or more trained deep volumetric 3D CNNs. In one embodiment, the additional multivariate time series data may include incomplete 2D multivariate time series data. For example, the incomplete multivariate time series data may include a time dimension, but a missing or incomplete feature dimension. The time dimension may include a future predetermined period of time (e.g., a time period that has not yet occurred, etc.).

Further, in one embodiment, the additional multivariate time series data may be transformed into a three-dimensional (3D) temporal tensor, utilizing the procedure detailed above. In another embodiment, the 3D temporal tensor may be input into the one or more trained deep volumetric 3D CNNs. In yet another embodiment, the deep volumetric 3D CNNs may be located within a deep volumetric residual network.

Further still, in one embodiment, the deep volumetric 3D CNNs may utilize identified local dependencies and auto-correlational patterns among the values of the dimensions learned during training to determine one or more feature maps for the additional multivariate time series data. In one embodiment, the feature maps go through a recurrent neural network to output the future values prediction. In another embodiment, stack-wise average pooling may also be performed on the output (e.g., the feature maps) of the 3D convolution(s) from the one or more trained deep volumetric 3D CNNs. For example, stack-wise average pooling may produce a 2D feature map output. This 2D feature map output may then be input into a sequential network.

Also, in one embodiment, the sequential network may include a CNN feature map and one or more recurrent neural networks (e.g., one or more instances of long short-term memory (LSTM), etc.). In another embodiment, the sequential network may output the predicted future values for the additional multivariate time series data. In yet another embodiment, adaptive hyperparameter tuning may be applied to the 3D temporal tensor in order to determine optimal parameters required for the temporal tensor transformation. For example, an adaptive hyperparameter optimizer may select optimal parameters required for temporal tensor transformation through propagation of a prediction error.

In this way, a neural network may be trained to perform multivariate time series prediction/forecasting utilizing non-linear data in an efficient manner by transforming 2D data into a 3D tensor that is used as input to the neural network. This may simplify a manner in which training of the neural network is performed, which may reduce an amount of processing resources required by a computing device performing such training. This may in turn increase a performance of such computing device.

Deep Learning for Multivariate Time Series Prediction with 3D Transformations

Multivariate time series prediction is the task of predicting a series of future values of multiple variables based on their historical values. Modeling these temporal phenomena allows for the discovery of new trends, the detection of anomalies, and the prediction of future signals which can be utilized across different domains such as finance, mobile, IoT, cloud services, meteorology, and medical fields. Thus, developments which improve the modeling of temporal phenomena can help analysts, clients, and companies make improved decisions based on historical data. Time series forecasting is widely applied in various domains across different sectors. This forecasting is useful in developing temporally dynamic models which can help with critical decision-making processes.

One exemplary improvement to multivariate time series prediction is the performance of temporal tensor transformations, where a time series feature representation is created by stacking multiple sub-sampled 2D sliding-windows as a 3D tensor structure. Another exemplary improvement to multivariate time series prediction is a volumetric convolutional neural network architecture that includes a volumetric 3D convolution operation which discovers both the local temporal dependencies and auto-correlational patterns among multi-dimensional input variables.

One exemplary use case for multivariate time series prediction is an internet-of-things (IoT) smart home monitoring and control system. For example, modern IoT infrastructures provide various tools for measuring parameters from the home environment through different sensors recording information such as temperature, humidity, and electricity usage. By implementing 3D transformations and using a volumetric convolutional neural network architecture, improved feature extraction may be implemented by capturing non-linear feature-temporal and auto-correlational features from sensor information.

Additionally, an end-to-end solution may be made available that avoids manual feature engineering or preprocessing to closely follow statistical assumptions. Further, fully automated tuning may be implemented for automated hyperparameter selection for temporal tensor transformations. Further still, adaptive training may be implemented (e.g., as periodic online training, etc.) to enable the model to adaptively learn new patterns, which may allow for the mitigation of sudden shifts in data distribution, seasonal shifts in data distribution, etc.

Temporal Tensor Transformation

In one embodiment, time series data representation is created by stacking multiple 2D sliding-windows as a 3D tensor structure. This representation allows for a volumetric CNN to extract auto-correlational features from the time series.

The transformation is defined as the following function:

$TT: X \rightarrow \hat{X}$, where $X \in \mathbb{R}^{n \times m}$ and $\hat{X} \in \mathbb{R}^{n \times \omega \times o}$, n is equal to the number of features in the time series, m is equal to the number of timesteps in the original input sample time series, w is equal to the window size of a sliding window, and o is equal to the total number of sub-sampled window stacks generated by the transformation.

In one embodiment, o can be deterministically computed by the following equation, given several different key parameters:

$$o = \left\lfloor \frac{m + 2p - d(\omega - 1) - 1}{s} \right\rfloor + 1,$$

where p is the padding, d is the dilation, and s is the window stride.

Figure 4:
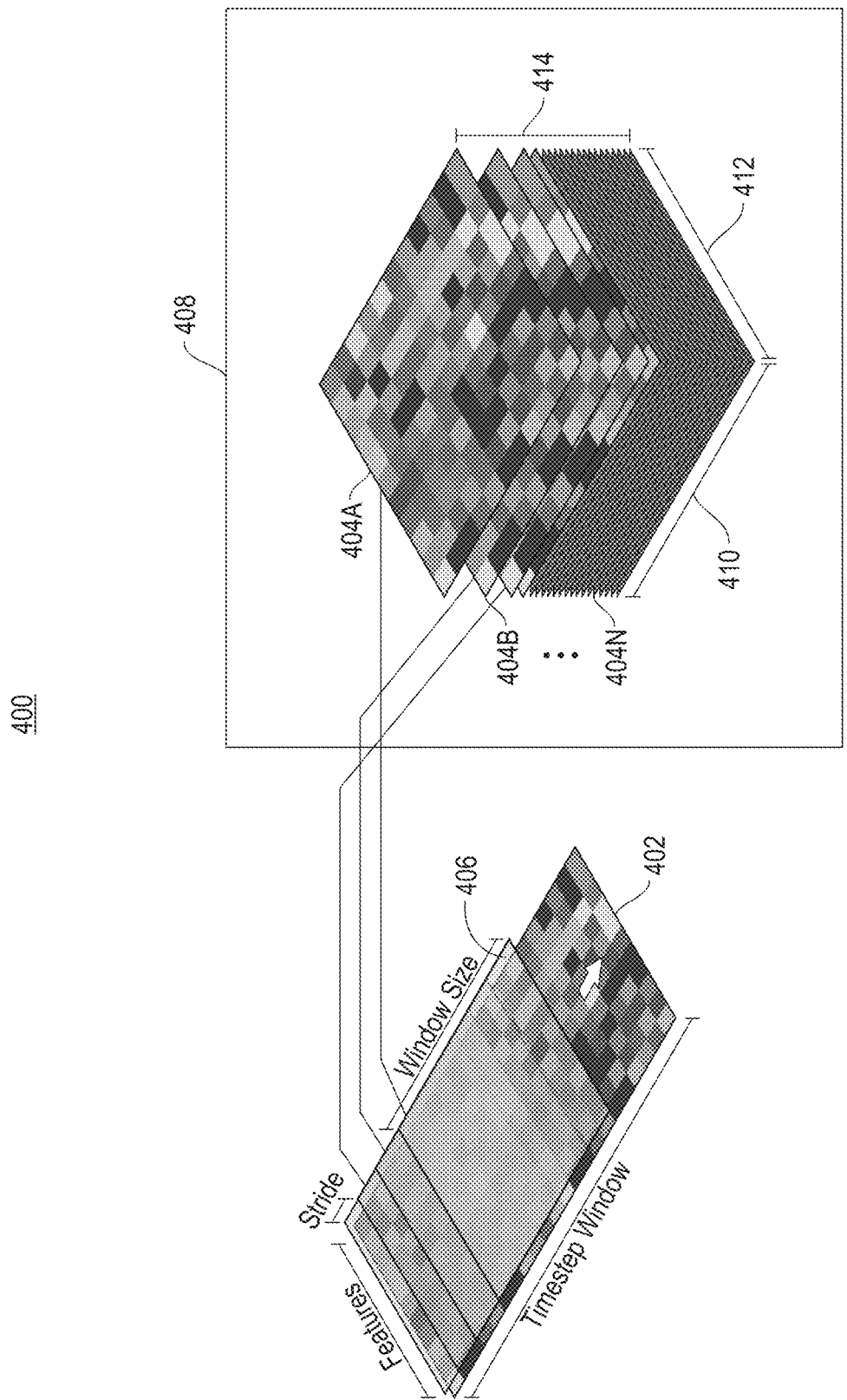
FIG. 4 illustrates an exemplary temporal tensor transformation, in accordance with one embodiment of the present invention.

FIG. 4 illustrates an exemplary temporal tensor transformation 400, according to one exemplary embodiment. As shown, 2D multivariate time series data 402 is divided into a plurality of temporal window slices 404A-N, utilizing a sliding window 406 of a predetermined size. These temporal window slices 404A-N are stacked to create a tensor 408. The tensor 408 has three dimensions—a time dimension 410, a feature dimension 412, and height/depth dimension 414. As a result, the 2D multivariate time series data 402 is transformed into a 3D tensor 408.

Auto-Correlational Features

In time series modeling, autocorrelation is a type of correlation which occurs when a signal during some interval reoccurs at a delayed time period. Linear regression models assume that error terms are independent; however, in a time series, such errors can be autocorrelated. For example, autocorrelation can be found in seasonal time series data.

Adaptive Hyperparameter Tuning Process

To provide an end-to-end solution which still allows for flexibility, a hyperparameter tuning process may be used for the above parameters. For example, errors from the model may be propagated to actively select and refine each parameter in the transformation. In one embodiment, a black-box optimization strategy such as a Bayesian optimization may be applied over a user-defined search space.

Deep Volumetric Residual Networks

In one embodiment, a prediction architecture may include one or more residual network-based modules. For example, a residual network (ResNet) based module is used for the extraction of non-linear feature-temporal and auto-correlational features. These operations may be repeated in a deep fashion as necessary depending on the available computational resources as well as training and test performance. During training, the volumetric convolutions learn a three-dimensional kernel (instead of a feature-wise separate kernel). This allows for the joint learning of feature-dependent and temporal correlations from the data.

Figure 5:
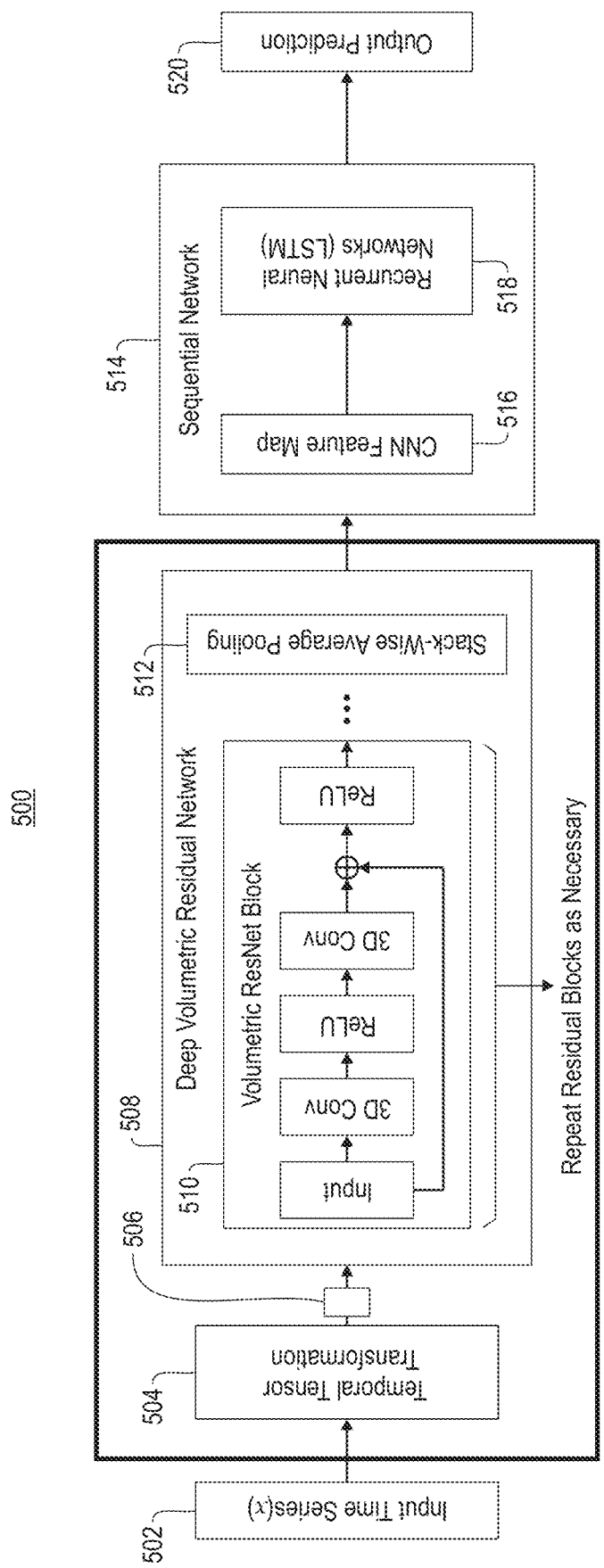
FIG. 5 illustrates an exemplary deep learning environment for performing multivariate time series prediction with 3D transformations, in accordance with one embodiment of the present invention.

FIG. 5 illustrates an exemplary deep learning environment 500 for performing multivariate time series prediction with 3D transformations, according to one embodiment. As shown, historical 2D multivariate time series data 502 is transformed by a temporal tensor transformation module 504 to create a 3D tensor 506, which is then used as input into a deep volumetric residual network 508 containing a volumetric residual network block 510. In one embodiment, the deep volumetric residual network 508 may contain a plurality of volumetric residual network blocks 510.

Additionally, the volumetric residual network block 510 performs 3D convolutions on the 3D tensor 506 to create output that is then pooled using a stack-wise average pooling module 512 of the deep volumetric residual network 508. This output is then sent to a sequential network 514 including a CNN feature map 516 and recurrent neural network 518, which produces an output prediction 520.

In one embodiment, a system and method are provided to predict future values of multivariate time series, where (1) the historical time series is transformed into a 3D temporal tensor by stacking multiple 2D sliding-windows, which consist of temporal and feature dimensions; (2) the 3D temporal tensor goes through deep volumetric 3D convolution neural networks (CNN), which discover both the local dependency and auto-correlational patterns among the variables; (3) the CNN feature maps go through a recurrent neural network to output the prediction; and (4) the adaptive hyperparameter optimizer selects optimal parameters required for the temporal tensor transformation through the propagation of the prediction error.

Additionally, in one embodiment, historical parameters may be received in a device. For example, the device may include a home appliance, a computing device, a node within a distributed computing system, etc. In another example, the historical parameters may be received for a predetermined application running within the device. In yet another example, the historical parameters may include historical power usage for the device, historical temperature data for the device (e.g., a device running temperature), historical data usage by an application running on the device (e.g., network data usage, bandwidth, etc.), historical processor utilization by an application running on the device, etc.

Further, in one embodiment, the historical parameters for the device may be transformed into a three-dimensional (3D) temporal tensor. For example, the transforming may include dividing the historical device parameters into a plurality of 2D temporal slices, and stacking the plurality of 2D temporal slices to create the 3D temporal tensor.

Further still, in one embodiment, one or more deep volumetric 3D convolutional neural networks (CNNs) may be trained, utilizing the 3D temporal tensor. In another embodiment, future values may be predicted for the device, utilizing the one or more trained deep volumetric 3D CNNs.

For example, one or more future times and/or dates may be input to the deep volumetric 3D CNNs, and the deep volumetric 3D CNNs may output predicted values for the device at those future time/dates. These predicted values may include predicted processor utilization for an application running on a device, predicted data usage for an application running on a device, etc. These predicted values may be used to allocate bandwidth and processor resources to the application running on the device, and may therefore improve a performance of a device and the application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving historical two-dimensional (2D) multivariate time series data;
   transforming the historical 2D multivariate time series data into a three-dimensional (3D) temporal tensor, wherein the 3D temporal tensor includes a time-based geometric object represented by an array of components that are functions of coordinates of a space;
   training one or more deep volumetric 3D convolutional neural networks (CNNs), utilizing the 3D temporal tensor; and
   predicting future values for additional multivariate time series data, utilizing the one or more trained deep volumetric 3D CNNs.

2. The computer-implemented method of claim 1, wherein the historical 2D multivariate time series data include 2D multivariate time series data that has been obtained from sensors and recorded in a hardware memory prior to a current time and date.

3. The computer-implemented method of claim 1, wherein a first dimension of the historical 2D multivariate time series data includes a time dimension, and a second dimension of the historical 2D multivariate time series data includes a feature dimension.

4. The computer-implemented method of claim 1, comprising performing stack-wise average pooling on output of 3D convolutions from the one or more trained deep volumetric 3D CNNs.

5. The computer-implemented method of claim 1, comprising applying adaptive hyperparameter tuning to the 3D temporal tensor to determine optimal parameters required for a temporal tensor transformation via a propagation of prediction error.

6. The computer-implemented method of claim 1, wherein the one or more deep volumetric 3D CNNs each include a residual network-based module used for extraction of non-linear feature-temporal and auto-correlational features.

7. The computer-implemented method of claim 1, wherein the one or more deep volumetric 3D CNNs discover local temporal dependencies and auto-correlational patterns among values of dimensions of the 3D temporal tensor.

8. The computer-implemented method of claim 1, wherein during training, volumetric convolutions of the one or more deep volumetric 3D CNNs learn a three-dimensional kernel.

9. The computer-implemented method of claim 1, wherein the additional multivariate time series data include incomplete 2D multivariate time series data having a time dimension, the incomplete 2D multivariate time series data also having a missing or incomplete feature.

10. The computer-implemented method of claim 1, wherein the one or more trained deep volumetric 3D CNNs utilize identified local temporal dependencies and auto-correlational patterns among values of dimensions learned during training to determine one or more feature maps for the additional multivariate time series data.

11. The computer-implemented method of claim 1, comprising using the predicted values to allocate bandwidth and processor resources to an application running on a device thereby improving performance of the device and the application.

12. The computer-implemented method of claim 1, wherein the transforming includes dividing the historical 2D multivariate time series data into a plurality of 2D temporal slices, wherein the transforming includes stacking the plurality of 2D temporal slices to create the 3D temporal tensor.

13. The computer-implemented method of claim 1, and comprising utilizing the predicted future values to discover a new trend, to detect anomalies, to predict future signals, to discover a new trend and detect anomalies, to discover a new trend and predict future signals, to detect anomalies and predict future signals, or to detect anomalies, discover a new trend and predict future signals.

14. A computer program product for performing multivariate time series prediction with three-dimensional transformations, the computer program product comprising a computer readable storage medium having program instructions embodied therewith, the program instructions executable by a processor to cause the processor to:
receive, utilizing the processor, historical two-dimensional (2D) multivariate time series data;
transform, utilizing the processor, the historical 2D multivariate time series data into a three-dimensional (3D) temporal tensor, wherein the transforming includes dividing the historical 2D multivariate time series data into a plurality of 2D temporal slices, wherein the transforming includes stacking the plurality of 2D temporal slices to create the 3D temporal tensor;
train, utilizing the processor, one or more deep volumetric 3D convolutional neural networks (CNNs), utilizing the 3D temporal tensor; and
predict future values for additional multivariate time series data, utilizing the processor and the one or more trained deep volumetric 3D CNNs.

15. The computer program product of claim 14, wherein the historical 2D multivariate time series data include 2D multivariate time series data that has been recorded prior to a current time and date.

16. The computer program product of claim 14, wherein a first dimension of the historical 2D multivariate time series data includes a time dimension, and a second dimension of the historical 2D multivariate time series data includes a feature dimension.

17. The computer program product of claim 14, comprising program instructions executable by a processor to cause the processor to perform stack-wise average pooling on output of 3D convolutions from the one or more trained deep volumetric 3D CNNs.

18. The computer program product of claim 14, comprising program instructions executable by a processor to cause the processor to apply adaptive hyperparameter tuning to the 3D temporal tensor to determine optimal parameters required for a temporal tensor transformation via a propagation of prediction error.

19. A system, comprising:
a hardware processor;
hardware memory coupled to the processor; and
logic integrated with the processor, executable by the processor, or integrated with and executable by the processor, the logic being configured to:
receive historical two-dimensional (2D) multivariate time series data;
transform the historical 2D multivariate time series data into a three-dimensional (3D) temporal tensor, wherein the 3D temporal tensor includes a time-based geometric object represented by an array of components that are functions of coordinates of a space;
train one or more deep volumetric 3D convolutional neural networks (CNNs), utilizing the 3D temporal tensor; and
predict future values for additional multivariate time series data, utilizing the one or more trained deep volumetric 3D CNNs.

* * * * *